(12) United States Patent
Rubenstein et al.

(10) Patent No.: US 6,278,716 B1
(45) Date of Patent: Aug. 21, 2001

(54) MULTICAST WITH PROACTIVE FORWARD ERROR CORRECTION

(75) Inventors: Daniel S. Rubenstein, Belchertown; James F. Kurose, Northampton; Donald F. Towsley, Amherst, all of MA (US)

(73) Assignee: University of Massachusetts, Boston, MA (US)

( * ) Notice: Subject to any disclaimer, the term of this patent is extended or adjusted under 35 U.S.C. 154(b) by 0 days.

(21) Appl. No.: 09/046,944

(22) Filed: Mar. 23, 1998

(51) Int. Cl.$^7$ .................................................. H04L 3/24

(52) U.S. Cl. .................................. 370/432; 370/394

(58) Field of Search .................................. 370/390, 394, 370/428, 473, 474, 432, 389, 229, 401, 351, 352; 714/748, 749, 756

(56) References Cited

PUBLICATIONS

Floyd et al., "A Reliable Multicast Framework for Light-weight Sessions and Application Level Framing", IEEE/ACM Transactions on Networking, 1996.

Papadopoulos et al., "An Error Control Scheme for Large–Scale Multicast Applications", Infocom, 1998, pp. 1–28.

Xu et al., "Resilient Multicast Support for Continuous–Media Applications", NossDav Workshop, May 1997.

Rizzo et al., "A Reliable Multicast Data Distribution Protocol Based on Software FEC Techniques", 4th IEEE HPCS '97, Jun. 1997, pp. 1–5.

Li et al., "Layered Video Multicast with Retransmission (LVMR): Evaluation of Error Recovery Schemes", NossDav Workshop, May 1997.

Towsley et al., "A Comparison of Sender–Initiated and Receiver–Iniated Reliable Multicast Protocols", IEEE Journal on Selected Areas of Communications, vol. XX, No. 6, Apr. 1997.

Nonnenmacher et al., "How Bad is Reliable Multicast Without Local Recovery?" IEEE Infocom, Mar. 1998, pp. 1–22.

DeLucia et al., "Multicast Feedback Suppression Using Representatives", IEEE Infocom, Mar. 1997.

McAuley, "Reliable Broadband Communication Using A Burst Erasure Correcting Code", ACM Sigcomm Conference, Aug., 1990.

Yajnik et al., "Packet Loss Correlation in the MBone Multicast Network", IEEE Globecom Conference, Nov., 1996.

(List continued on next page.)

Primary Examiner—Dang Ton
(74) Attorney, Agent, or Firm—Fish & Richardson P.C.

(57) ABSTRACT

Apparatus and methods for multicasting blocks of data to a plurality of receivers, the blocks including a first block and a second block, the first block comprising $k_1 \geq 1$ data packets, the transmission of the first block comprising an initial transmission of the $k_1$ data packets and $h_1 \geq$ repair packets and one or more subsequent transmissions of additional repair packets in response to repair requests, wherein any $k_1$ of the data packets and repair packets provide sufficient information to recover the $k_1$ data packets; and multicasting a second block comprising $k_2 \geq 1$ data packets, the transmission of the second block comprising an initial transmission of the $k_2$ data packets and $h_2 \geq$ repair packets, wherein any $k_2$ of the data packets and the repair packets of the second block provide sufficient information to recover the $k_2$ data packets of the second block and either or both $k_2$ and $h_2$ differ from $k_1$ and $h_1$, respectively. The invention provides multicast data transmission with adaptive proactive forward error correction (FEC) in combination with automatic repair requesting (ARQ), and reduces response feedback implosion in multicast over digital packet networks.

41 Claims, 4 Drawing Sheets

PUBLICATIONS

Pejhan et al., Error Control Using Retransmission Schemes in Multicast Transport Protocols for Real–Time Media, IEEE/ACM Transactions on Networking, vol. 4, No.3, Jun. 1996, pp. 413–427.

Levine, "The Case for Reliable Concurrent Multicasting Using Shared Ack Trees", ACM Multimedia Conference, Nov., 1996.

Paul, "Reliable Multicast Transport Protocol", IEEE Journal on Selected Areas in Communication, Apr., 1997, pp. 1–19.

Nonnenmacher et al., "Parity–Based Loss Recovery for Reliable Multicast Transmission", ACM Sigcomm Conference, Aug. 1997.

Rizzo, "Effective Erasure Codes for Reliable Computer Communication Protocols", ACM Computer Communication Review, vol. 27, No. 2, Apr. 1997, pp. 24–36.

Luby et al., "Practical Loss–Resilient Codes", 29th Annual Symposium on Theory of Computation, 1997.

MULTICAST WITH PROACTIVE FORWARD ERROR CORRECTION

STATEMENT REGARDING FEDERALLY SPONSORED RESEARCH OR DEVELOPMENT

The research leading to this invention was supported in whole or in part by the National Science Foundation, under #NCR-9527163. The United States Government may have certain rights in this invention.

FIELD OF THE INVENTION

This invention relates to the reliable transmission of data, particularly in a multiple receiver environment.

BACKGROUND OF THE INVENTION

IP (Internet Protocol) Multicast, an IETF (Internet Engineering Task Force) standard, has become an important component of the Internet. A framework for distributing data to multiple receivers through the use of multicast groups is described in S. Deering, D. R. Cheriton, Multicast Routing in Datagram Internetworks and Extended LANs, ACM Transactions on Computer Systems, vol. 8, no. 2, pp. 85–110, May 1990. More recent proposals to streamline the efficiency of the multicast delivery of data continue to use the multicast group concept to allow protocols to scale for applications that involve many receivers. See, for example, S. Deering, et al., The PIM Architecture for Wide-Area Multicast Routing, IEEE/ACM Transactions on Networking, vol. 4, no. 2, pp. 153–162, April 1996; F. Ballardie, et al., Core based trees (CBT) An architecture for Scalable Interdomain Multicast Routing, Proceedings of ACM SIGCOMM '93, pp. 85–95, ACM, September 1993.

Because the Internet is a best-effort service network, end-to-end reliability mechanisms are needed to ensure delivery of data. Receivers typically insure they obtain enough data by requesting repair packets when a data packet fails to arrive. When multicast groups grow large, simple reliable multicast protocols suffer from a condition known as feedback implosion, which is an overload of network resources due to many receivers trying to send repair requests for a single packet. A number of solutions exist to avoid this implosion effect, using techniques such as randomized timer, local recovery (in which intermediate receivers, rather than the original sender, send repair packets), and hierarchical recovery. See, for example, D. Towsley, et al., A Comparison of Sender-Initiated and Receiver-Initiated Reliable Multicast Protocols, IEEE Journal on Selected Areas in Communications, April 1997. While such techniques are effective in providing reliability, they can result in significant and unpredictable delays, making them unsuitable for applications that have stringent real-time constraints. See, for example, S. Pejhan, et al., Error Control Using Retransmission Schemes in Multicast Transport Protocols for Real-Time Media, IEEE/ACM Transactions on Networking, vol. 4 no. 3, pp. 413–427, June 1996.

Multicast protocols that elicit feedback from receivers have used a variety of techniques to obtain the feedback without implosion. The Realtime Transport Protocol/Realtime Transport Control Protocol (RTP/RTCP) places a maximum rate at which a receiver can issue feedback reports, where the rate is inversely proportional to the size of the multicast group. See January 1996 Internet RFC 1889 RTP: A Transport Protocol for Real-Time Applications. The reliable multicast protocol(see, e.g., S. Paul, et al., Reliable Multicast Transport Protocol (RMTP), IEEE Journal on Selected Areas in Communications, special issue on Network Support for Multipoint Communication, 15(3): pp. 407–421, April 1997) also uses periodic feedback from receivers, while Scalable Reliable Multicast (SRM) (S. Floyd, et al., A reliable multicast framework for light-weight sessions and application level framing, IEEE/ACM Transactions on Networking, December 1997) uses randomized delays to avoid implosion. These techniques for preventing feedback implosion introduce additional latencies. Thus, using them to provide reliability decreases the likelihood of a repair reaching a receiver before a hard deadline.

To reduce repair latencies, entities in the network other than the sender can be used to provide repairs. Choosing the repairing entity can be done in a variety of ways. SRM uses an approach where nearby members are usually first to respond to a repair request. RMTP selects fixed receivers in a predetermined fashion to perform repairs, while the Lorax protocol and the Structure-Oriented Resilient Multicast (STORM) protocol build virtual trees connecting various receivers over which repairs are unicast. Lorax and STORM are respectively described in B. N. Levine, et al., The Case for Concurrent Reliable Multicasting Using Shared Ack Trees, Proceedings of ACM Multimedia 1996; and R. Xu, et al., Resilient Multicast Support for Continuous Media Applications, NOSSDAV (Workshop on Networking and Operating System Support for Digital Audio and Video) 1997. In one system, described in D. DeLucia, K. Obraczka, Multicast Feedback Suppression Using Representatives, Proceedings of IEEE Infocom '97, the sender dynamically selects a subset of receivers to provide immediate feedback of loss: its success depends upon a selection process that chooses which receivers make good representatives.

There has also been a recent interest in providing resilient multicast service for real-time data, where data is retransmitted only if delivery can occur before the real-time deadline. Data is not reliably delivered, but a higher throughput (the effective rate of data transfer, considering both the data and needed repairs) can be achieved than without any retransmission. Two protocols that are designed to provide resilient multicast are STORM and Layered Video multicast with Retransmissions (LVMR) (described in X. Li et al., Layered Video multicast with Retransmissions (LVMR): Evaluation of Hierarchical Rate Control, Proceedings of IEEE INFOCOM '98.) Both STORM and LVMR make use of unicast retransmissions to reduce the cost of packet retransmission and rely on other receivers nearer to the loss than is the sender to provide the repair and thereby reduce delay and implosion. However, latency can increase when there is no nearby receiver to repair the loss. Rather than follow the shortest path within the network, repairs are unicast from receiver to receiver, resulting in a longer propagation path. Additional latencies also arise because end hosts are involved in forwarding a repair and do so at a rate that is much slower than internal routers. These factors make it difficult for such protocols to place bounds on their resilience, even if delays and loss rates are known from a receiver to its repair point.

Active networking can also improve real-time reliable multicast performance by providing mechanisms that allow the Internet to make a better effort than merely the best effort service which it currently performs. Two examples of techniques that have been shown to improve performance are repair servers in the network and the rerouting of repair requests by routers in the network. Active networking requires routers to perform additional services, and applications that require these services will have to compete for limited router resources.

Forward error correction (FEC) is a technique that reduces the bandwidth overhead of repairing errors or losses in bit streams. See, for example, Richard E. Blahut, Theory and Practice of Error Control Codes, Addison-Wesley, 1983. The FEC approach has been compared to a local recovery approach in J. Nonnenmacher, et al., How bad is reliable multicast without local recovery?, Proceedings of IEEE INFOCOM 98, in an environment where losses occur only on links that are directly connected to receivers. However, this type of loss does not resemble what is observed in the Internet. Real-time performance of reliable Multicast techniques that use FEC have previously been examined and compared unfavorably to ARQ (Automatic Repeat reQuest). See, M. Lucas, et al., Distributed Error Recovery for Continuous Media Data in Wide-Area Multicast, University of Virginia Technical Report CS95-52, Jul. 18, 1995. An interesting approach to the use of FEC that can deliver data reliably without ARQ is presented in L. Rizzo, L. Vicisano, A Reliable Multicast data Distribution Protocol based on software FEC techniques, Proceedings of the Fourth IEEE HPCS '97 Workshop, Chalkidiki, Greece, June 1997. However, present join-leave latencies for multicast groups make it too inefficient in use of bandwidth to support real-time applications.

Reed-Solomon codes are often suggested as the means by which data losses can be efficiently repaired. A description of the mathematics used to perform Reed-Solomon encoding is found in A. McAuley, Reliable Broadband Communication Using a Burst Erasure Correcting Code, ACM SIGCOMM '90, pp. 297–306, September 1990. It has been shown that a Reed-Solomon encoding combined with ARQ can significantly reduce bandwidth requirements of a large reliable multicast session over that which is consumed using standalone ARQ. See, J. Nonnenmacher, et al., Parity-Based Loss Recovery for Reliable Multicast Transmission, ACM SIGCOMM '97, September 1997, pp. 289–300. FEC encoding and decoding can be performed at a rate sufficient for many real-time applications. See, for example, L. Rizzo, Effective Erasure Codes for Reliable Computer Communication Protocols, Computer Communication Review, April 1997.

Systems equipped with Reed-Solomon encoders and decoders can make use of repair packets to recover from loss. The sender forms blocks, where each block consists of a subset of the data packets it wishes to deliver reliably. The number of data packets that are used to form a block is commonly referred to as the blocksize. The subset of data packets are fed into the encoder to generate repair packets, which may also be referred to as FEC packets. Each receiver contains a decoder that is used to retrieve lost data packets of a particular block by applying the decoder to a sufficient number of received data packets and FEC packets from the same block. The sufficient number of packets that must be received for a Reed-Solomon decoder to perform decoding equals the blocksize. Once this number of packets is received, any lost data packet in the block can be retrieved from the decoder. A detailed discussion of packet-level FEC techniques can be found in J. Nonnenmacher, et al., Parity-Based Loss Recovery for Reliable Multicast Transmission; implementation issues are considered in A. McAuley, Reliable Broadband Communication Using a Burst Erasure Correcting Code, and L. Rizzo, Effective Erasure Codes for Reliable Computer Communication Protocols, all of which are cited above. FEC techniques exist that can be used to generate as many repair packets as needed, and this can be done at data rates on the order of 8 Mbytes/sec on commodity personal computers, such as a 133 MHZ Pentium® microprocessor-based system.

SUMMARY OF THE INVENTION

The invention provides apparatus and methods for transmitting data employing adaptive proactive forward error correction with automatic repeat requesting that minimizes the number of repair requests required, and thus facilitates multicasting real-time data on the Internet.

In general, in one aspect, the invention features methods and apparatus for transmitting data, useful for multicasting data. Implementations of the invention feature a process multicasting blocks of data to a plurality of receivers, the blocks including a first block and a second block, the first block comprising $k_1 \geq 1$ data packets, the transmission of the first block comprising an initial transmission of the $k_1$ data packets and $h_1 \geq 0$ repair packets and one or more subsequent transmissions of additional repair packets in response to repair requests, wherein any $k_1$ of the data packets and repair packets provide sufficient information to recover the $k_1$ data packets; and multicasting a second block comprising $k_2 \geq 1$ data packets, the transmission of the second block comprising an initial transmission of the $k_2$ data packets and $h_2 \geq 0$ repair packets, wherein any $k_2$ of the data packets and the repair packets of the second block provide sufficient information to recover the $k_2$ data packets of the second block and either or both $k_2$ and $h_2$ differ from $k_1$ and $h_1$, respectively.

Advantageous implementations of the invention may include one or more of the following features. The number $h_2$ of repair packets in the second block initial transmission is calculated based on a history of repair requests received for previously transmitted blocks. Each data packet and repair packet of each of the blocks carries information identifying the block and an ordinal position of the packet within the block. Each data packet and repair packet of each block i carries information communicating the number $h_i$ of repair packets transmitted in the initial transmission of the block. Each data packet and repair packet of each block carries a block number i, a sequence number defining the ordinal position of the packet among the data packets and repair packets in the block, a blocksize $k_i$ denoting the number of data packets in the block, and a proactivity factor $\rho$ from which the initial number $h_i$ of repair packets in the block can be calculated. The number $h_2$ of repair packets in the initial transmission of the second block is calculated based on a history of repair requests received for previously transmitted blocks. The repair packets are encoded using a Reed-Solomon encoding. The initial number $h_i$ of repair packets for block i is calculated from a proactivity factor $\rho_i$ applied to the blocksize $k_i$, the method of calculating the factor $\rho_i$ comprising: for a window of W blocks preceding the current block i, determining if any repair requests were received; for any block x in the window in which no repair requests were received, setting $\omega_x = \rho_x - 1$; for any block x in the window in which a repair request was received, setting $\omega_x = \rho_x + (\log_z N_x)/k$, where $N_x$ is the number of repair requests received for block x, and setting $M_x$ to the greatest repair packet sequence number requested for block x; setting $A_W$ to the largest $\omega_x$ obtained for all blocks in the window, and setting $B_W$ to the average of $M_x$ for each block x having at least one repair request; if no repair requests were received for any of the preceding W blocks, setting $\omega_i = \omega_{i-1} - Dk/2$, where D is the period of the data transmission rate; if a repair request was received for at least one block in the window, calculating $\omega_i$ to have a value $\omega_i = \omega' \times (1-\alpha) + A_W \alpha$, where $\omega' = \omega_{i-1} \times (1-\alpha) + B_W \alpha$, and where $\alpha$ is a decay constant $0 < \alpha \leq 1$; and setting $\rho_i = \omega_i$. Suitable values include W is 8, the logarithm base z is 10, and $\alpha$ is 0.25.

In another aspect, the invention features methods and apparatus useful for a receiver to receive a multicast transmission of blocks of data packets from a multicasting sender. Implementations of the invention feature a method insuring to a probability P that the receiver will receive enough data packets and repair packets to recover the data packets of a block no later than a deadline time by estimating the end-to-end loss of packets from the sender to the receiver, and initiating proactive forward error correction with the sender to compensate for the estimated loss of packets and to meet the deadline time with a probability not less than P, proactive forward error correction causing the sender to send previously-unsent repair packets for the block.

Advantageous implementations of the invention can include one or more of the following features. The loss of packets is estimated using a loss model of the end-to-end transmission losses of packets from the sender to the receiver. The receiver is one of a plurality of receivers in a multicast group receiving the multicast transmission. The receiver insures the probability P is met regardless of any deadlines or probabilities of any other receivers of the multicast stream of data packets.

In another aspect, the invention features methods and apparatus useful for a receiver to receive a multicast transmission of blocks of data packets from a multicasting sender. Implementations of the invention feature a method receiving from a multicasting sender the packets of a block of packets comprising $k \geq 1$ data packets and zero or more repair packets, wherein any k of the data packets and repair packets provide sufficient information to recover the k data packets and wherein each of the packets has a sequential sequence number denoting the ordinal position of the packet in the block; calculating a number of repair packets desired by the receiver; and calculating the sequence number of the last of any repair packets desired by the receiver.

Advantageous implementations of the invention can include one or more of the following features. Calculating the sequence number of the last of any repair packets desired by the receiver comprises calculating an estimate of S−U, where S is the maximum sequence number sent by the sender and U is the number of data and repair packets that are underway to the receiver that will be received; and calculating the sequence number of the last of any repair packets desired by the receiver to satisfy the relationship: sequence number=S−U+d, where d is the number of packets desired by the receiver. In this method, d=n, n being the difference between k, the number of packets the receiver needs, and the number of packets the receiver has received, or d=m, m being a number of packets greater than the difference between k, the number of packets the receiver needs, and the number of packets the receiver has received. The estimate of S−U is the largest sequence number received by the receiver. The estimate of S−U is the larger of the largest sequence number received by the receiver and the largest sequence number requested in a repair request broadcast by another receiver in the receiver group. The estimate of S−U is the larger of the largest sequence number received by the receiver and the largest sequence number requested in a repair request broadcast by another receiver in the receiver group. The method further comprising: sending to the sender a repair request requesting the identified repair packets by their sequence numbers. The method further comprises sending to the sender a repair request requesting the identified repair packets by the sequence number of the last one of them. The repair request is multicast to a plurality of receivers in the multicast receiver group. The method further comprises receiving from the sender a block identifier for each packet of the block; and including in the repair request the block identifier of the block to which the repair request relates. The repair request includes the sequence number of the last repair packet being requested in the repair request. Repair requests multicast by other receivers in the multicast receiver group are monitored, and a repair request to the sender requesting the identified repair packets is sent only if the identified repair packets were not previously requested by another receiver. The sequence numbers of the received packets are examined to detect gaps in the sequence of received packets of the block; the number k+h' of packets of the block sent so far is received from the sender; and a repair request is sent to the sender as soon as an absence of n>h' packets in the sequence of received packets is detected. The repair request requests a number of repair packets m that is greater than n. The amount by which m exceeds n is calculated from a proactivity factor received from the sender. The amount by which m exceeds n is calculated from a history of the number of packets requested in repair requests sent by the receiver. The variable m satisfies the relationship that the probability of receiving n out of m packets, D(m, n), is greater than a probability threshold P of reliable transmission established for the receiver. The probability of receiving n out of m packets is greater than a last chance guarantee probability threshold established for the receiver. The receiver implements a policy to achieve an overall block goodput rate such that the probability that a complete block is received on or before a final deadline is the probability threshold P, the method further comprising computing m such that the probability D(m, n) of receiving n out of m packets is greater than or equal to (P−D(l, k))/(1−D(l, k)), where l is the number of packets of the block previously sent by the sender. If $D(l, k) \geq P$, then no further attempt is made by the receiver to obtain the block. The variable m satisfies the relationship $$D(m, n) = D(m, n, L) + D(m, n, R),$$

where R is the state of receiving a packet, L is the state of losing a packet, the probability of a receiver in state R remaining in state R is α, the probability of losing a packet and moving to state L is 1−α, the probability of a receiver in state L losing another packet and remaining in state L is β, and the probability of receiving a packet and moving to state R is 1−β, where D(m, n, L) is the probability of sending m packets, receiving at least n packets, and ending up in state L, and D(m, n, R) is the probability of sending m packets, receiving at least n packets, and ending up in state R, $$D(m, n, L) = D(m-1, n, L)\beta + D(m-1, n, R)(1-\alpha),$$

$$D(m, n, R) = D(m-1, n-1, L)(1-\beta) + D(m-1, n, R)\alpha,$$

$$D(n, n, L) = 0,$$

$$D(n, n, R) = p_\alpha \alpha^n + p_\beta (1-\beta)\alpha^{n-1},$$

$$D(n, 0, L) = p_\alpha (1-\alpha)\beta^{n-1} + p_\beta \beta^n,$$

and $$D(n, 0, R) = 0$$

where n>0, $p_\alpha$ is the probability of the system initially residing in state R, and $p_\beta$ is the probability of the system initially residing in state L. Where the block must be decoded prior to a deadline, m is calculated to insure that the receiver will receive at least k packets in sufficient time to decode the block. The packet loss is modeled as a temporally-independent loss process with a packet loss probability p and D(m, n) satisfies $$D(m, n) = \sum_{i=n}^{m} \binom{m}{i}(1-p)^i p^{(m-i)}.$$

A final time $T_{final}$ is calculated, by which a repair request should be issued to meet a hard deadline, $T_{final}$ satisfying the relationship $$T_{final} = T - (r + p_n \tau + t(b, k)),$$

where T is the time of an earliest deadline for any data packet in the block that has not yet been received, r is an estimated upper bound on round trip time to and from the sender, k is the blocksize, $p_n$ is the number of additional packets that the receiver is requesting that the sender transmit, τ is the rate at which the sender can inject packets into the network, and t(b, k) is the time required by the receiver to decode and recover b packets from a blocksize of k.

In another aspect, the invention features methods and apparatus useful for sending and receiving data, by multicasting data from a sender to a plurality of receivers, said system comprising a sender apparatus comprising means for multicasting blocks of data to a plurality of receivers, the blocks including a first block and a second block, the first block comprising $k_1 \geq 1$ data packets, the transmission of the first block comprising an initial transmission of the $k_1$ data packets and $h_1 \geq 0$ repair packets and one or more subsequent transmissions of additional repair packets in response to repair requests, wherein any $k_1$ of the data packets and repair packets provide sufficient information to recover the $k_1$ data packets; and multicasting a second block comprising $k_2 \geq 1$ data packets, the transmission of the second block comprising an initial transmission of the $k_2$ data packets and $h_2 \geq 0$ repair packets, wherein any $k_2$ of the data packets and the repair packets of the second block provide sufficient information to recover the $k_2$ data packets of the second block and either or both $k_2$ and $h_2$ differ from $k_1$ and $h_1$, respectively; a plurality of receiver apparatuses comprising means for initiating proactive forward error correction with the sender to compensate for lost packets, proactive forward error correction causing the sender to send previously-unsent repair packets for the block; and a network connecting the sender apparatus to said plurality of receiver apparatuses.

Advantageous implementations of the invention can include one or more of the following features. The network is the Internet. The network is a wide-area LAN. The network is an ATM network. Calculating the sequence number of the last of any repair packets desired by the receiver comprises calculating an estimate of S−U, where S is the maximum sequence number sent by the sender and U is the number of data and repair packets that are underway to the receiver that will be received; and calculating the sequence number of the last of any repair packets desired by the receiver to satisfy the relationship: sequence number= S−U+d, where d is the number of packets desired by the receiver. The estimate of S−U is the largest sequence number received by the receiver. The estimate of S−U is the larger of the largest sequence number received by the receiver and the largest sequence number requested in a repair request broadcast by another receiver in the receiver group. The estimate of S−U is the larger of the largest sequence number received by the receiver and the largest sequence number requested in a repair request broadcast by another receiver in the receiver group. The method further comprising: sending to the sender a repair request requesting the identified repair packets by their sequence numbers. The method further comprises sending to the sender a repair request requesting the identified repair packets by the sequence number of the last one of them. The repair request is multicast to a plurality of receivers in the multicast receiver group. The method further comprises receiving from the sender a block identifier for each packet of the block; and including in the repair request the block identifier of the block to which the repair request relates. The repair request includes the sequence number of the last repair packet being requested in the repair request. Repair requests multicast by other receivers in the multicast receiver group are monitored, and a repair request to the sender requesting the identified repair packets is sent only if the identified repair packets were not previously requested by another receiver. The sequence numbers of the received packets are examined to detect gaps in the sequence of received packets of the block; the number k+h' of packets of the block sent so far is received from the sender; and a repair request is sent to the sender as soon as an absence of n>h' packets in the sequence of received packets is detected. The repair request requests a number of repair packets m that is greater than n. The amount by which m exceeds n is calculated from a proactivity factor received from the sender. The amount by which m exceeds n is calculated from a history of the number of packets requested in repair requests sent by the receiver. The variable m satisfies the relationship that the probability of receiving n out of m packets, D(m, n), is greater than a probability threshold P of reliable transmission established for the receiver. The probability of receiving n out of m packets is greater than a last chance guarantee probability threshold established for the receiver. The receiver implements a policy to achieve an overall block goodput rate such that the probability that a complete block is received on or before a final deadline is the probability threshold P, the method further comprising computing m such that the probability D(m, n) of receiving n out of m packets is greater than or equal to (P−D(l, k))/(1−D(l, k)), where l is the number of packets of the block previously sent by the sender. If D(l, k)≧P, then no further attempt is made by the receiver to obtain the block. A final time $T_{final}$ is calculated, by which a repair request should be issued to meet a hard deadline, $T_{final}$ satisfying the relationship $$T_{final} = T - (r + p_n \tau + t(b, k)),$$

where T is the time of an earliest deadline for any data packet in the block that has not yet been received, r is an estimated upper bound on round trip time to and from the sender, k is the blocksize, $p_n$ is the number of additional packets that the receiver is requesting that the sender transmit, τ is the rate at which the sender can inject packets into the network, and t(b, k) is the time required by the receiver to decode and recover b packets from a blocksize of k.

Among the advantages of the invention are one or more of the following. It reduces feedback implosion at the sender by reducing the number of repair requests received and can reduce the bandwidth required for a multicast session. Receivers in remote parts of a multicast tree can receive repairs sooner than they would otherwise and performance can improve with increasing number of receivers as receivers closer to the sender respond to errors sooner than remote receivers. The invention adapts to network demands to minimize bandwidth usage, but expands use of bandwidth as needed. The invention can reduce latency for receivers. The invention may permit any individual receiver to achieve receipt of all repairs required before deadline within a given probability, and thus enable each receiver to meet any hard real-time guarantee. The invention can employ any loss model. The invention employs an end to end protocol, and thus avoids the need for additional router support.

DETAILED DESCRIPTION

Figure 1:
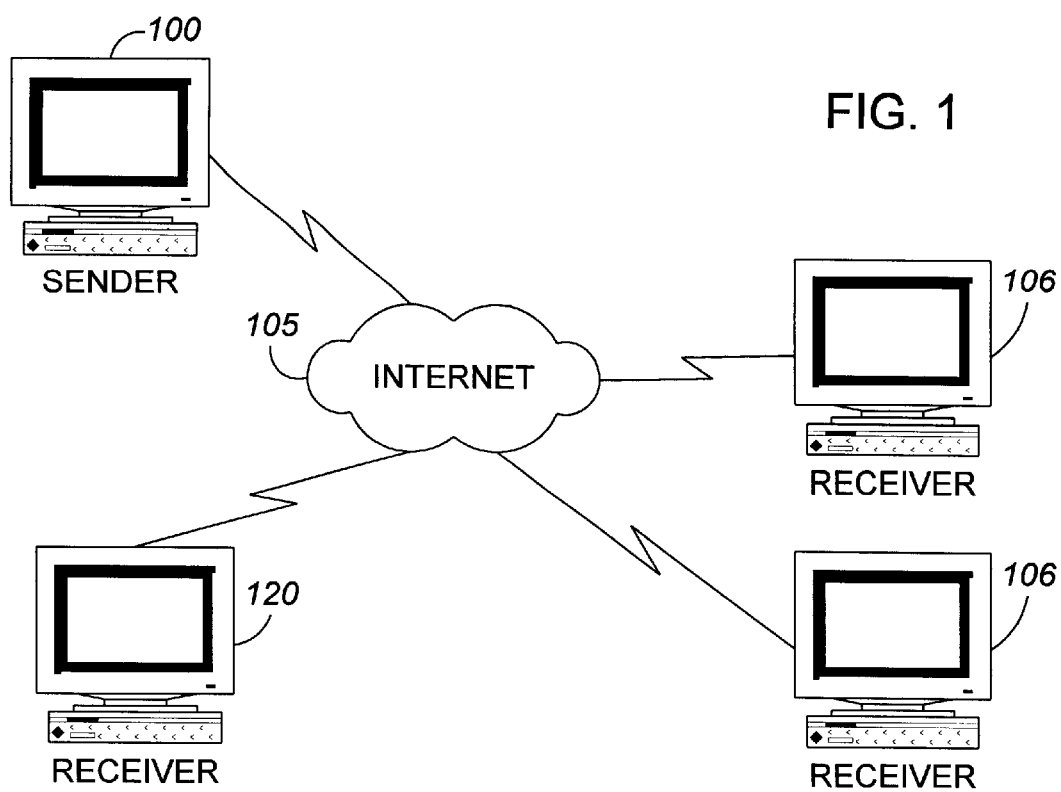
FIG. 1 is a block diagram of a simplified network including a sender node and receiver node suitable for practicing the invention.

The invention can be implemented in the following familiar context. As illustrated in FIG. 1, a sender/receiver system for real-time multicast data transmission has at its core a sender 100 multicasting data, such as real-time audio and video data, over a transmission medium such as the Internet 105 to at least one receiver 120, and generally to many such receivers, such as receivers 106.

Figure 2:
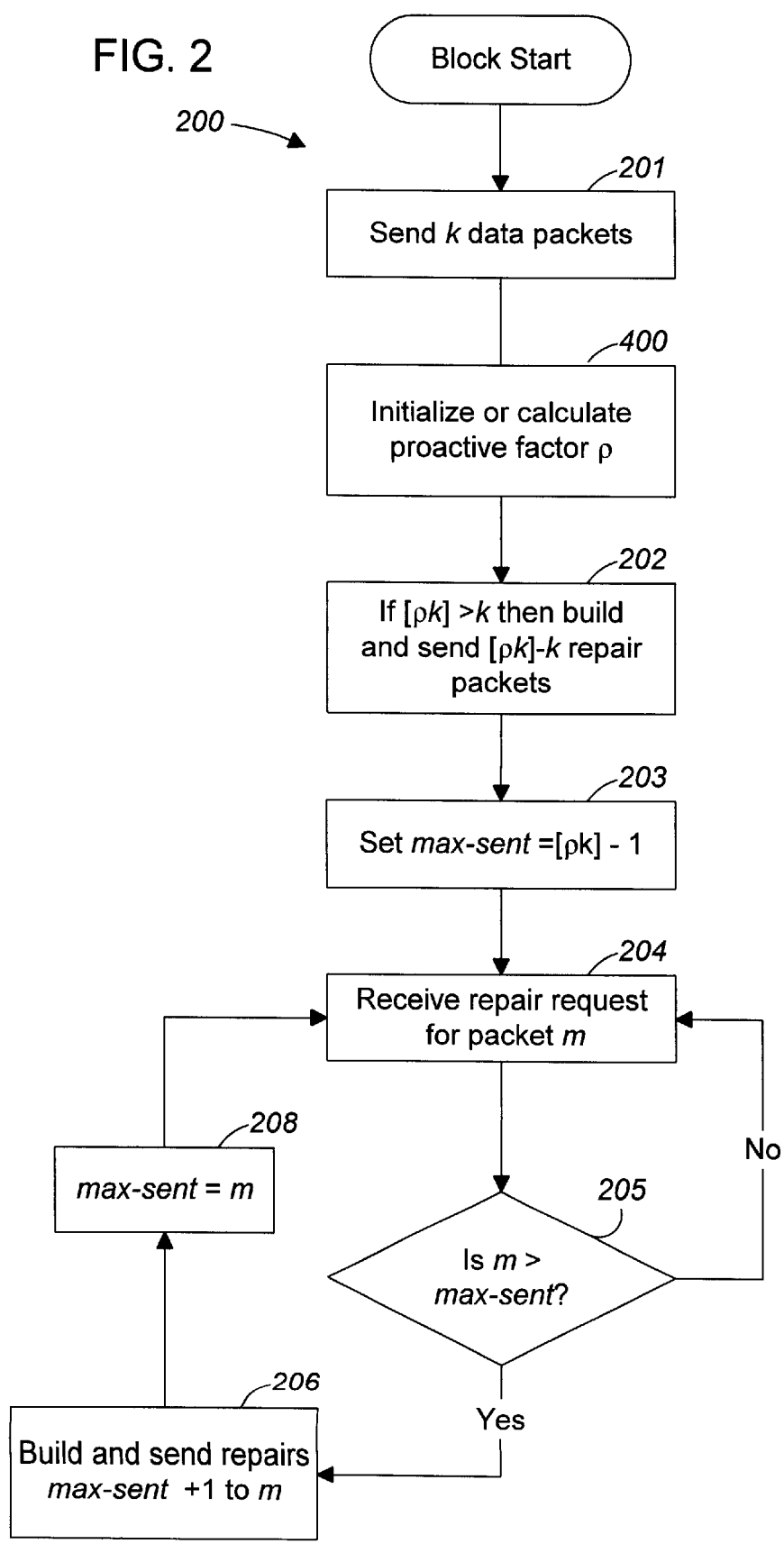
FIG. 2 is a flowchart of a sender protocol of the invention.
Figure 3:
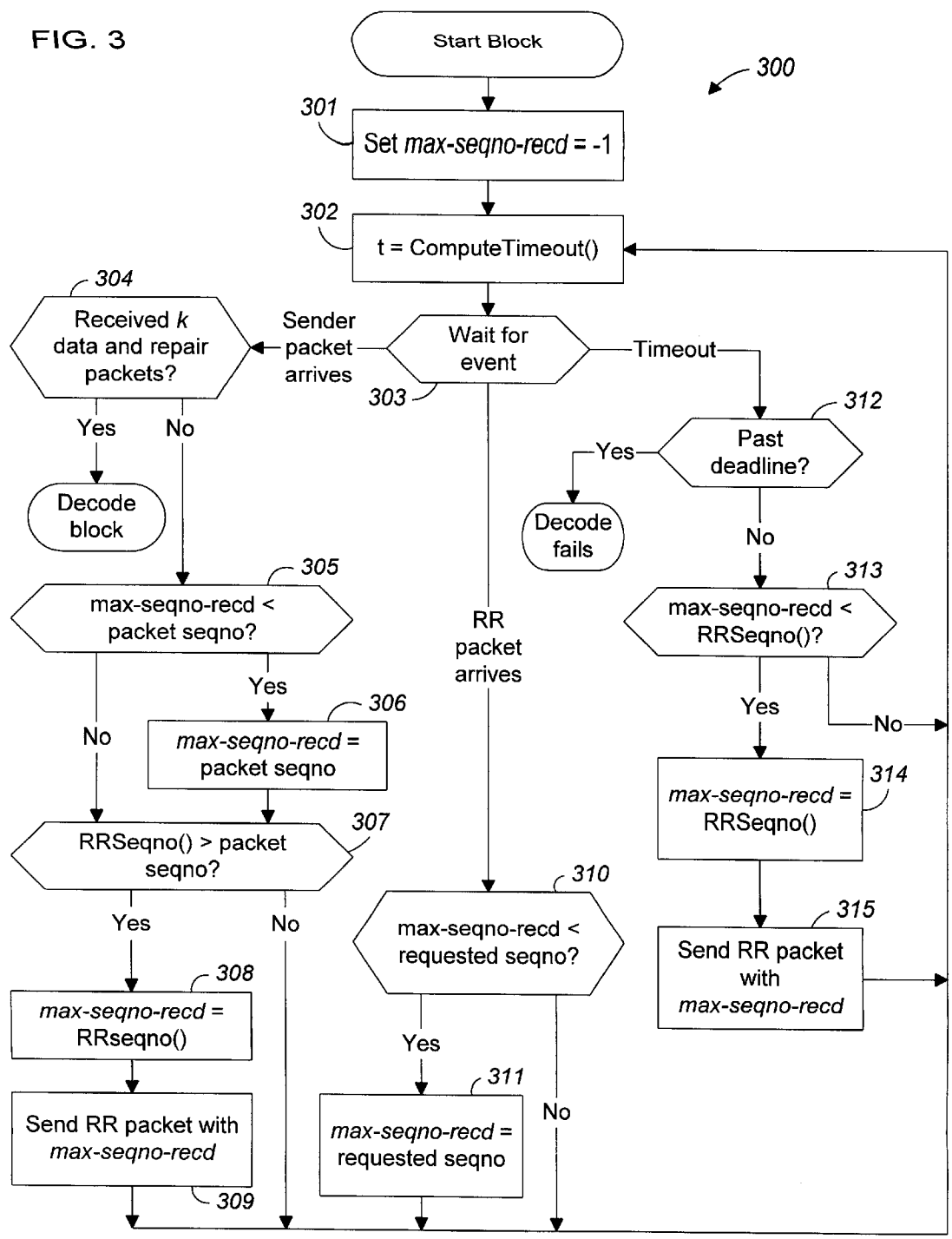
FIG. 3 is a flowchart of a receiver protocol of the invention.

To insure that all data arrives in a timely fashion, the sender and receiver(s) implement a protocol including proactive forward error correction (FEC) with automatic repair requests (ARQ) without relying on error correction by intermediate receivers, for example the specific protocol illustrated in FIG. 2 and FIG. 3.

FIG. 2 shows a flowchart of a sender protocol 200 in accordance with the invention. The sender forms blocks, where each block consists of a subset of the data packets it wishes to deliver reliably. With a blocksize of k, the sender sends blocks of packets that include k data packets (step 201) and a number of FEC repair packets determined by a proactivity factor $\rho$, as will be described. This factor is calculated dynamically during the course of a multicast session and may be calculated as frequently as once for each block. Thus, at some time before the repair packets for the block are transmitted, the proactivity factor $\rho$ is initialized or calculated (step 400), as will be described later in reference to FIG. 4. The repair packets are used to correct packet losses.

The number of repair packets to be sent initially for a block is $[\rho k]-k$ (where $[\rho k]$ indicates the product $\rho k$ rounded to the nearest integer). If this number is positive, then so many repair packets are built and sent (step 202). The repair packets are built using a Reed-Solomon encoder, or a similar error correction code. For block i, these repair packets are designated packets (i, k) through (i, $[\rho k]-1$). The data packets in block i are designated (i, 0) through (i, k−1). The variable max-sent is set equal to $[\rho k]-1$ (step 203). The sender may then receive a repair request ("RR") requesting packet m (step 204). If m is less than the number of the highest packet already sent for block i, the sender returns to waiting for additional repair requests (step 205). If m is greater than max-sent, the sender builds and sends additional repair packets from max-sent+1 to m (step 206), and sets max-sent equal to m (step 208). The sender then returns to waiting for additional repair requests for this block until it times out, runs out of buffer space, or passes a deadline.

Because each packet is identified by block number and position, blocks may be interleaved during transmission. By transmitting repair packets along with the initial data packets (rather than waiting and sending repair packets only on request), the sender reduces the possibility that a receiver will need to request additional repairs, and thus reduces the likelihood of feedback implosion. It should be noted that repair packets may be built using parity codes other than Reed-Solomon, for example using XOR packets, with appropriate adjustments to the number of packets required as needed.

Thus, for example, assume that the blocksize is 8, and the sender has sent packets (4,0), (4,1), . . . (4,9) (eight data packets, and two proactive repair packets). A receiver fails to receive all packets, and requests four additional repair packets by sending a repair request for packet (4,13). The sender then builds repair packets (4,10), (4,11), (4,12) and (4,13), and multicasts the packets to all receivers. If the sender subsequently receives a repair request for packet (4,15), the sender builds and sends repair packets (4,14) and (4,15).

FIG. 3 shows a flowchart of a receiver protocol 300 for receiving a block of k packets in accordance with the invention. Data variables are initialized by setting max-seqno-recd=−1 (step 301) and computing the next timeout time t for the block (step 302). The receiver then waits for an event, which may be either receipt of a packet or a timeout. In response to any event, the receiver may send a repair request requesting additional repair packets, as will be described. The receiver then resets the time of the next timeout. The processing or sending of a repair request causes the receiver to increase the time at which the next timeout occurs. Arrival of a data or repair packet can either increase or decrease the time at which the next timeout occurs.

For each data or repair packet received from the sender, the receiver determines whether it has received a total of k packets for the block (decision step 304). If k packets have been received, the receiver decodes the block and is finished. If not, the receiver determines if the sequence number of the packet is greater than max-seqno-recd (step 305). If the packet's sequence number (packet seqno) is greater, max-seqno-recd is set to the packet's sequence number (step 306). In either event, the packet sequence number is then compared to RRSeqno( )(step 307) (described below). If RRSeqno( ) is greater than the packet sequence number, max-seqno-recd is set to RRSeqno( ) (step 308) and a repair request is sent with sequence number max-seqno-recd (step 309). Whether or not RRSeqno( ) is greater, the receiver then loops back, determines the next timeout time, and waits for the next event (steps 302 and 303).

If the packet received is a repair request generated by another receiver, the receiver compares the requested packet sequence number with max-seqno-recd (decision step 310). If max-seqno-recd is not less than the requested sequence number, the receiver loops back to calculate the next timeout time and wait for the next event (steps 302 and 303). If max-seqno-recd is less than the requested sequence number, the receiver sets max-seqno-recd to the requested sequence number (step 311) before looping back to step 302.

It should be noted that steps 305 and 310 implicitly use the greatest packet sequence number received or the greatest repair request sequence number received as an estimate of the sequence number of the last repair packet sent by the sender. This estimate may be improved by requiring the sender to include in any series of packets the total number of packets to be sent, and/or the number of the greatest repair packet being sent. This can be implemented by having the sender include a set of three or four "burst bits" in each repair packet, which indicate the number of repair packets to follow. For example, if the sender is sending a series of four repair packets, the first repair packet would include burst bits 0011 (binary 3) to indicate that three additional repair packets were being transmitted after the initial packet. For each succeeding packet, the burst bits would be decremented. If an additional repair request was received during transmission of the four repair packets, the burst bits counter would be set to a higher value to reflect the additional repair packets now scheduled for transmission.

If the event is a timeout trigger, the receiver first determines whether the block is past a deadline for decoding (step 312). If the block is past deadline, the decode fails (the yes branch of step 312). If not, the receiver determines if max-seqno-recd is less than RRSeqno (step 313). If max-seqno-recd is less than RRSeqno, max-seqno-recd is set equal to RRSeqno (step 314), and a packet requesting a repair packet having sequence number max-seqno-recd is sent (step 315). The receiver then determines the next timeout (step 302). If max-seqno-recd is not less than RRSeqno( ), the receiver simply determines the next timeout (step 302). Suppression of repair requests is a function of ComputeTimeout( ), described below.

The function RRSeqno( ) is used to set the sequence number of the repair packet requested that is sent to the sender in a repair request. For any given block, the receiver determines when the deadline is for decoding the block, and the latest time it may send a repair request and receive a repair packet and still meet the deadline (LastSendTime( )). The receiver also keeps track of which packets have been received (using a bit vector Received( )), and how many packets are still needed in order to decode the block (Needed( )). The receiver also calculates how many repair packets need to be requested in order to meet the deadline (PktsForHard( )). The receiver must also determine which packet is expected next (ExpectedData( )), which will be the next packet in sequence after the packet with the greatest sequence number yet received (if the receiver is an aggressive receiver), or the greater of that number and the greatest sequence number requested in a repair request from another receiver (if the receiver is a patient receiver). When called, RRSeqno( ) determines whether the current time is equal to LastSendTime( ). If the time at which RRSeqno( ) is called is equal to LastSendTime( ), RRSeqno( ) returns the sequence number equal to one less than the next expected packet sequence number plus the number of repair packets needed calculated by PktsForHard( ) (in other words, ExpectedData( )−1+PktsForHard( )). If the current time is less than LastSendTime( ), RRSeqno( ) returns the sequence number equal to one less than the next expected packet sequence number plus the number of repair packets needed (ExpectedData( )−1+Needed( )).

Different receiver behaviors may be obtained by using different methods of computing the next timeout. For example, ComputeTimeout( ) may issue a timeout as soon as the receiver determines that it is missing too many packets to decode the block (the "aggressive" receiver protocol). For example, if the blocksize k is 5 and $\rho$ is 1.2, the sender will issue five data packets and one proactive repair packet. The receiver must receive at least five of the six packets to decode the block. If the receiver receives packets 1 and 4, it may issue a repair request for at least one or two packets on receipt of packet 4, as the remainder of the packets in the block will not be sufficient to decode the block whether the remaining packets in the block are subsequently lost or received. The receiver is aggressive in reacting immediately to the presumed loss of packets. Similarly, if the receiver determines that it will not receive all of the requested repair packets, it immediately issues an additional repair request. Alternatively, ComputeTimeout( ) may wait to issue a timeout until after sufficient time has elapsed for all packets to have been received (the "patient" receiver protocol). This protocol reduces the amount of feedback sent to the sender as compared to feedback sent by the aggressive receiver, because the receiver may suppress its repair requests if it receives a multicast repair request from a receiver closer to the sender. The patient receiver also sends fewer repair requests because it waits until enough time has elapsed for all k+h packets to have been sent, and then sends one repair request for the number of packets (or more) that it needs (by sending a repair request containing the sequence number of the highest packet requested). Once a repair is requested, the patient receiver waits until sufficient time to transmit all requested packets has elapsed before requesting any additional repair packets. In contrast, the aggressive receiver may send a repair request each time the loss of an additional packets is detected.

For example, ComputeTimeout( ) waits for an event. If the event is the arrival of a data or repair packet, ComputeTimeout( ) updates Received( ) with the sequence number of the packet received, updates Needed( ), and if the sequence number of the packet received is the highest yet received for the block, increments ExpectedData( ). If the sequence number of the packet is equal to the value of DataAtTO( ) (which calculates the last packet sequence number expected to arrive before timeout for the block), DataAtTO( ) is incremented and the current timeout time for the block is incremented by the data period (if the packet received was a data packet) or the send period (if the packet was a repair packet). If the event is receipt or transmission of a repair request, and the sequence number of the repair requested is the largest sequence number yet for the block, ComputeTimeout( ) increments the timeout time by the data period for all data packets in the range between DataAtTO( )+1 and the sequence number of the largest repair request, and the send period for each repair packet in that range. A time bound is set equal to the current time plus RTT (a conservative estimate of the time required to send a repair request to the sender, and receive the requested repair packets in response). The time bound is then incremented in the same way that the timeout time was incremented, then decremented by the data period for each data packet in the range ExpectedData( ) to DataAtTO( ), and the send period for each repair packet in the range ExpectedData( ) to DataAtTO( ). If the timeout time is less than the current time plus RTT plus the time bound, then the timeout time is set equal to the current time plus RTT plus the time bound. If the timeout time is greater than the value returned by LastSendTime( ) (which calculates the latest time the receiver may send a repair request and expect to receive a repair packet prior to deadline), the timeout time is set equal to LastSendTime( ). If the event is not receipt of a packet or receipt or transmission of a repair request, then DataAtTO( ) and ExpectedData( ) are incremented. The timeout time is incremented by the data period if the next packet expected is a data packet, and by the send period if the next packet expected is a repair packet.

A repair request may be unicast to the sender, or it may be multicast to some or all of the receivers in a multicast session. The advantages of unicasting the repair request are that the receiver saves bandwidth by transmitting the repair request only to the sender instead of the entire multicast tree.

The disadvantage is that the receiver must always send a repair request if it does not receive sufficient data. It becomes difficult for the receiver to determine the sequence number to include in its repair request. The advantage to multicasting a repair request is that the receiver may compare any received repair requests to its own requirements, and opt to not send a repair request if a repair request has already been sent by another receiver that would meet its needs. Further, the receivers are better able to determine how many packets the sender has multicast, by examining the repair requests from other receivers, and can more accurately determine the appropriate sequence number to include in its repair request.

Because a receiver does not depend on other receivers to transmit requests for repairs it can experience good performance even when located in sparse regions of the network. Furthermore, a receiver's performance can only improve as the number of participating receivers increases, since other receivers that are closer to the sender can respond more quickly to loss, and additional repairs can reach receivers that are farther from the sender sooner than if the farther receivers had to issue the additional repair requests themselves.

Because repairs are sent proactively, more receivers will obtain at least k packets in the initial transmission of each block, resulting in fewer repair requests being returned to the sender. Thus, the sender can effectively control feedback implosion by sending an appropriate number of repairs proactively in the initial transmission. The sender benefits little from adding proactivity to subsequent transmissions of a block after the initial transmission of a block because the number of subsequent repair requests is generally significantly smaller than the number requested for the initial transmission of a block.

On the other hand, receivers continue to benefit when proactivity is added in subsequent transmissions of a blocks, since continued proactivity can often reduce the time it takes for reliable receipt of a block. A receiver can incorporate proactivity in repair requests by sending a repair request that requests more than the number of packets still needed to complete the block. This allows each receiver to request a level of proactivity that best satisfies its own requirements. The amount of proactivity can be set in a variety of ways. For instance, a receiver can apply the sender's proactivity factor to its own request, and if it needs n packets, send a repair request asking for [ρn] packets. Alternatively, it can simply request an additional packet so that it can tolerate loss of one repair; or, if it knows the loss rate from the sender to itself, it can request a number of repairs that tolerates the expected loss.

If a receiver can estimate the loss rate from the sender to itself, it can use this proactive requesting ability to meet a deadline with probabilities that are extremely close to 1. To do so, the receiver must be able to calculate a lower bound on the probability of receiving at least n packets from a transmission of m packets. The lower bound is represented by D(m, n). It can be modeled, for example, using an independent loss model or a two-state model, the latter of which is a more accurate model for packet loss in the Internet.

In one independent loss model, the loss is modeled as a temporally-independent loss process with packet loss probability p, with D(m, n) satisfying $$D(m,n) = \sum_{i=n}^{m} \binom{m}{i}(1-p)^i p^{(m-i)}$$

Since $\lim_{m \to \infty} D(m,n)=1$, a receiver that needs packets can guarantee that the packets are received with a probability larger than any p<1 by determining an appropriate m that satisfies $D(m,n) \geq p$. A search for an appropriate m can be performed quickly, since D(m, n) satisfies the recurrence relation $$D(m,n) = D(m-1, n) + \binom{m-1}{n-1}(1-p)$$

with the initial condition $D(n,n)=(1-p)^n$.

The two state loss model includes states R (receipt of a packet) and L (loss of a packet). If the receiver is in state R, the probability of remaining in state R is α, and the probability of losing a packet and moving to state L is 1−α. If the receiver is in state L, the probability of losing another packet and remaining in state L is β, and the probability of receiving a packet and moving to state R is 1−β. D(m, n, L) is the probability of sending m packets, receiving at least n packets, and ending up in state L, and D(m, n, R) is the probability of sending m packets, receiving at least n packets, and ending up in state R. Then, $D(m, n, L)=D(m-1, n, L)\beta+D(m-1, n, R)(1-\alpha)$, $D(m, n, R)=D(m-1, n-1, L)(1-\beta)+D(m-1, n, R)\alpha$, $D(m, n)=D(m, n, L)+D(m, n, R)$ where $D(n, n, L)=0$ $D(n, n, R)=p_\alpha \alpha^n + p\beta(1=\beta)\alpha^{n-1}$ $D(n, 0, L)=p_\alpha(1-\alpha)\beta^{n-1}p_\beta\beta^n$ $D(n, 0, R)=0$ and n>0, $p_\alpha$ is the probability of the system initially residing in state R, and $p_\beta$ is the probability of the system initially residing in state L.

A receiver can use a conservative estimate of the time it takes to make a request and receive feedback for that request from the sender. If the receiver needs n packets to meet a hard deadline, it makes a request for m repair packets, choosing m large enough so that sufficient repairs arrive with a high enough probability. It must make the request a sufficient amount of time prior to the deadline (for example, using the conservative estimate) so that the repairs can arrive prior to the deadline.

The final timeout prior to a hard deadline may be computed using timeout=$T-(r+p_n\times\tau+t(b, k))$ where T is the deadline time for the block, r is the estimated round trip time (upper bound) to and from the sender (here assuming that the one-way trip is approximately r/2), k is the blocksize, $p_n$ is the number of packets requested, τ is the rate at which the sender injects packets into the network (including encoding time), and t(b, k) is the time required to decode and recover b packets from a blocksize of k. If Reed-Solomon encoding is employed, decoding time can be bounded by a linear function of blocksize, and t(b, k) can be written bkt. The packet injection rate may be estimated from the average spacing between consecutive data packets, while r may be estimated from the response time to previous repair requests.

The receiver may guarantee that if there is a hard deadline, then sufficient repairs will be delivered prior to the deadline within some probability P, for example for a probability of 95%, 99.9999%, or any other desired probability. To make such a "last chance" guarantee, at the latest time at which the receiver may request repairs and expect to receive repair packets in response, the receiver simply needs to choose m such that $D(m, n) \geq P$, where it needs n packets prior to the hard deadline.

Alternatively, the receiver may wish to achieve some overall block goodput rate, such that the probability that a complete block is received on or before the final deadline is P. If a receiver needs m packets prior to the deadline, it is sufficient to choose m such that $D(m, n) \geq (P-D(l, k))/(1-D(l, k))$, where l is the number of packets previously sent for the block, and k is the blocksize. This is often smaller, and never larger, than what is required to meet the last chance guarantee. If $D(l, k) \geq P$, then no attempt is made on the last repair request to retrieve the block. These results apply for both temporally uncorrelated loss, as well as for loss that can be modeled using the two state loss model. The receiver must simply use the appropriate formulation of D( ).

In addition to employing proactivity to insure that enough repair packets are received, the receiver may employ proactivity to insure that its repair request is received. For example, if there is a significant probability that a repair request will be lost, the receiver may send duplicate (or more) repair requests to insure that at least one will be received by the sender. As the duplicate repair requests request the same repair packets, this does not result in too many repair packets being sent in return. However, sending an excessive number of duplicate repair requests may result in feedback implosion. Accordingly, the number of duplicate repair requests may be limited by the algorithms set forth above, to the number of requests sufficient to guarantee receipt of the repair request to the desired probability.

Adding proactivity can decrease the expected number of repairs used to meet a last chance guarantee. However, meeting block goodput guarantees for high probabilities (99.9999%) uses a smaller expected number of repairs than what is required to deliver data reliably without imposing a hard deadline.

The proactivity factor ρ may be changed to meet changing conditions on the network. The sender may adjust the proactivity factor based on the number of repair requests it receives to optimize the amount of proactive FEC it performs.

Figure 4:
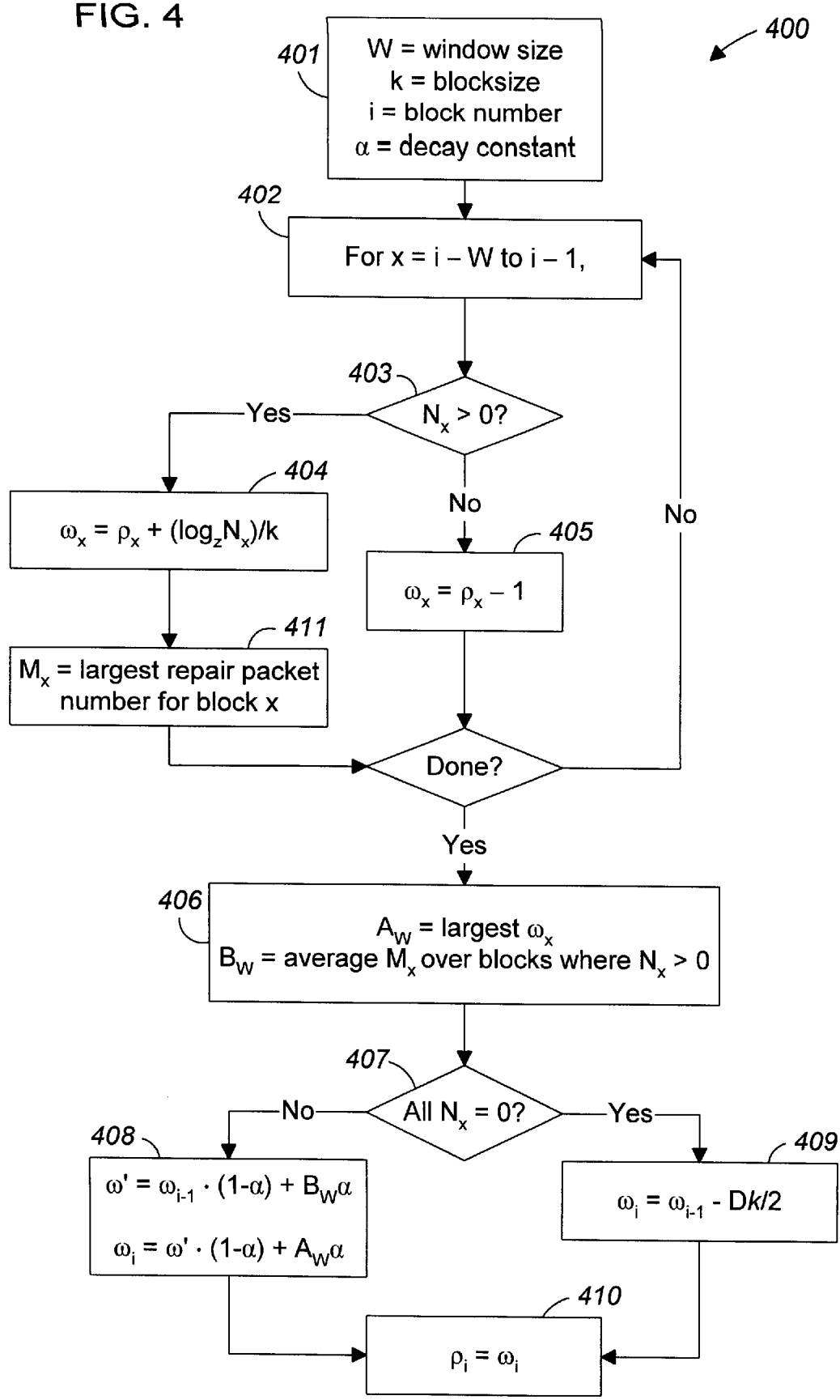
FIG. 4 is a flowchart of a method for adjusting the proactivity factor in response to network conditions.

FIG. 4 shows a flowchart of an adaptive method 400 that varies the sender's proactivity factor ρ during a session. The method adjusts ρ in response to changes in number of retransmissions per block, and stabilizes to a good proactivity factor in a network where loss and topology stay fixed. The method computes a proactivity factor for a block before the sender begins the block's initial transmission, and advantageously right before the transmission. The value of the proactivity factor may optionally be added as an extra field in the data packet so that receivers can adjust their response rates and requests based on current sender proactivity. To minimize the number of bits necessary, the information is passed in terms of the number of repair packets that the sender will generate along with the data. Eight bits is sufficient for this purpose, since the number of repair packets generated for a block is typically much smaller than 255.

The method 400 computes the proactivity factor by computing a weight $\omega_i$ that gives the proactivity factor $\rho_i$ for the i-th block. This value $\omega_i$ is obtained using a function that computes the current weight based on observations from previous blocks within a given window. It is averaged with the weights from previous blocks using an exponentially decaying average.

The sender begins by initializing variables W (the window size, that is, the number of prior blocks considered in the computation), k (the blocksize), i (the current block number) and α (a decay constant) (step 401). The decay constant a may be set to 0.25 initially. W must be large enough to contain blocks for which receivers have had an appropriate amount of time to send repair requests, but small enough that the computation tracks the current state of the session. The sender may use the round-trip times of receivers participating in the multicast group to determine an appropriate window size. For example, the sender may use a window equal to the number of blocks transmitted in approximately 250 ms. For a given block i, the sender considers the previous W blocks (step 402). The sender determines the number of repair requests $N_x$ received for each block x in the window. If the number of repair requests received for block x is zero (the no branch of step 403), $\omega_x$ is set to one less than the actual proactivity factor used for block x ($\rho_x$) (step 405), to cover the possibility that ρ may be too high, and thus wasting bandwidth. If the number of repair requests is greater than zero, $\omega_x$ is set to the proactivity factor used for that block ($\rho_x$) plus a term equal to the base-z logarithm of the number of repair requests for the block ($N_x$), divided by the blocksize k (step 404). This sum is an averaged estimate of the level of proactivity that would have suppressed most of the repair requests in block x. The value z is selected such that the sender can easily process approximately z repair requests per block. The variable $M_x$ is set equal to the size of the largest repair requested for block x (step 411).

Once all the blocks in the window have been examined, $A_W$ is set to the largest $\omega_x$ in the window, and $B_W$ is set to the average of all $M_x$ for blocks with $N_x>0$ in the window (step 406). If no repair requests were received for any block in the window (the "yes" branch of step 407), it is likely that the proactivity factor is too high, causing wasted bandwidth. Instead of performing a weighted average adjustment, the sender sets $\omega_i$ for the present block i to $\omega_{i-1}$ for the previous block, less a decay factor Dk/2, where D is the period in seconds at which data packets are transmitted (step 409). If repair requests were received (the "no" branch of step 407), the sender averages $B_W$ and $A_W$ into ω using an exponentially decaying rate of α, as follows (step 408):

$$\omega' = \omega_{i-1} \times (1-\alpha) + B_W \alpha$$

$$\omega_i = \omega' \times (1-\alpha) + A_W \alpha$$

The resulting $\omega_i$ is then used as the proactivity factor $\rho_i$ for block i (step 410).

The initial value of ρ may be set empirically, either based on past performance or experience, or at any reasonable value between 1 and 2, for example about 1.2 to about 1.7. If the initial value is set too low, the sender may experience feedback implosion. However, if the initial value is set too high, the sender will consume an unnecessarily high amount of bandwidth until ρ decays to an appropriate value.

The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, specially-designed ASICs (application-specific integrated circuits). Computers in which the invention is implemented are advantageously single-user computers configured to include audio and video output hardware suitable for presenting multimedia data to a user and network interface hardware and software suitable for receiving such data transmitted over a network connection.

Other embodiments are within the scope of the following claims. For example, the order of performing steps of the invention can be changed by those skilled in the art and still achieve desirable results. Further, the invention may be applied to networks other than IP multicast networks (for example, in satellite communications or cable networks), and may use packets other than IP packets (for example, ATM cells).

What is claimed is:

1. A method for transmitting data, comprising:
   multicasting blocks of data to a plurality of receivers, the blocks including a first block and a second block, the first block comprising $k_1 \geq 1$ data packets, the transmission of the first block comprising an initial transmission of the $k_1$ data packets and $h_1 \geq 0$ repair packets and one or more subsequent transmissions of additional repair packets in response to repair requests, wherein any of the data packets and repair packets provide sufficient information to recover the $k_1$ data packets; and
   a second block comprising $k2 \geq 1$ data packets, the transmission of the second block comprising an initial transmission of the $k_2$ data packets and $h_2 \geq 0$ repair packets, wherein any of the data packets and the repair packets of the second block provide sufficient information to recover the $k_2$ data packets of the second block and either or both $k_2$ and $h_2$ differ from $k_1$ and $h_1$, respectively.

2. The method of claim 1, wherein the number $h_2$ of repair packets is calculated based on a history of repair requests received for previously transmitted blocks.

3. The method of claim 1, wherein each data packer and repair packet of each of the blocks carries information identifying the block and an ordinal position of the packet within the block.

4. The method of claim 3, wherein each data packet and repair packet of each block i carries information communicating the number $h_i$ of repair packets transmitted in the transmission of the first block and of the second block.

5. The method of claim 4, wherein each data packet and repair packet of each block carries a block number i, a sequence number defining the ordinal position of the packet among the data packets and repair packets in the block, a blocksize $k_i$ denoting the number of data packets in the block, and a proactivity factor $\rho$ from which the initial number $h_i$ of repair packets in the block can be calculated.

6. The method of claim 5, wherein the number $h_2$ of repair packets in the initial transmission of the second block is calculated based on a history of repair requests received for previously transmitted blocks.

7. The method of claim 5, wherein the repair packets are encoded using a Reed-Solomon encoding.

8. The method of claim 2, wherein the initial number $h_i$ of repair packets for block i is calculated from a proactivity factor $\rho_i$ applied to the blocksize $k_i$, the method of calculating the factor $\rho_i$ comprising:
   for a window of W blocks preceding the current block i, determining if any repair requests were received;
   for any block x in the window in which no repair requests were received, setting $\omega_x = \rho_x - 1$;
   for any block x in the window in which a repair request was received, setting $\omega_x = \rho_x + (\log_z N_x)/k$, where $N_x$ is the number of repair requests received for block x, z represents the logarithm base, and setting $M_x$ to the greatest repair packet sequence number requested for block x;
   setting $A_W$ to the largest $\omega_x$ obtained for all blocks in the window, and setting $B_W$ to the average of $M_x$ for each block x having at least one repair request;
   if no repair requests were received for any of the preceding W blocks, setting $\omega_i = \omega_{i-1} - Dk/2$, where D is the period of the data transmission rate;
   if a repair request was received for at least one block in the window, calculating $\omega_i$ to have a value $\omega_i = \omega'H(1-\alpha) + A_W\alpha$, where $\omega' = \omega_{i-1}x(1-\alpha) + B_W\alpha$, and where $\alpha$ is decay constant $0 < \alpha \leq 1$; and
   setting $\rho_i = \omega_i$.

9. The method of claim 8, wherein W is 8, the logarithm base z is 10, and $\alpha$ is 0.25.

10. A method for a receiver to receive a multicast transmission of blocks of data packets from a multicasting sender, the method comprising:
    insuring to a probability $\rho$ that the receiver will receive enough data packets and repair packets to recover the data packets of a block no later than a deadline time by estimating the end-to-end loss of packets from the sender to the receiver; and
    initiating proactive forward error correction with the sender to compensate for the estimated loss of packets and to meet the deadline time with a probability not less than $\rho$, the proactive forward error correction causing the sender to send previously-unsent repair packets for the block.

11. The method of claim 10, wherein the loss of packets is estimated using a loss model of the end-to-end transmission losses of packets from the sender to the receiver.

12. The method of claim 10, wherein the receiver is one of a plurality of receivers in a multicast group receiving the multicast transmission.

13. The method of claim 10, wherein the receiver insures the probability ρ is met regardless of any deadlines or probabilities of any other receivers of the multicast stream of data packets.

14. A method for a receiver in a multicast receiver group to receive data, comprising:

receiving from a multicasting sender the packets of a block of packets comprising k≧1 data packets and zero or more repair packets, wherein any of the data packets and repair packets provide sufficient information to recover the k data packets and wherein each of the packets has a sequential sequence number denoting the ordinal position of the packet in the block;

calculating a number of repair packets desired by the receiver; and calculating the sequence number of the last of any repair packets desired by the receiver.

15. The method of claim 14, wherein calculating the sequence number of the last of any repair packets desired by the receiver comprises:

calculating an estimate of S−U, where S is the maximum sequence number sent by the sender and U is the number of data and repair packets that are underway to the receiver that will be received; and calculating the sequence number of the last of any repair packets desired by the receiver to satisfy the relationship: sequence number=S−U+d, where d is the number of packets desired by the receiver.

16. The method of claim 15, wherein d=n, n being the difference between k, the number of packets the receiver needs, and the number of packets the receiver has received.

17. The method of claim 15, wherein d=m, m being a number of packets greater than the difference between k, the number of packets the receiver needs, and the number of packets the receiver has received.

18. The method of claim 15, wherein the estimate of S−U is the largest sequence number received by the receiver.

19. The method of claim 15, wherein the estimate of S−U is the larger of the largest sequence number received by the receiver and the largest sequence number requested in a repair request broadcast by another receiver in the receiver group.

20. The method of claim 17, wherein the estimate of S−U is the larger of the largest sequence number received by the receiver and the largest sequence number requested in a repair request broadcast by another receiver in the receiver group.

21. The method of claim 14, further comprising:

sending to the sender a repair request requesting the identified repair packets by their sequence numbers.

22. The method of claim 14, further comprising:

sending to the sender a repair request requesting the identified repair packets by the sequence number of the last one of them.

23. The method of claim 14, wherein the repair request is multicast to a plurality of receivers in the multicast receiver group.

24. The method of claim 14, further comprising:

receiving from the sender a block identifier for each packet of the block; and including in the repair request the block identifier of the block to which the repair request relates.

25. The method of claim 24, further comprising:

including in the repair request the sequence number of the last repair packet being requested in the repair request.

26. The method of claim 23, further comprising:

monitoring repair requests multicast by other receivers in the multicast receiver group; and sending a repair request to the sender requesting the identified repair packets only if the identified repair packets were not previously requested by another receiver.

27. The method of claim 14, further comprising:

examining the sequence numbers of the received packets to detect gaps in the sequence of received packets of the block;

receiving from the sender the number k+h' of packets of the block sent so far; and sending a repair request to the sender as soon as an absence of n>h' packets in the sequence of received packets is detected.

28. The method of claim 27, wherein the repair request requests a number of repair packets m that is greater than n.

29. The method of claim 28, wherein the amount by which m exceeds n is calculated from a proactivity factor received from the sender.

30. The method of claim 28, wherein the amount by which m exceeds n is calculated from a history of the number of packets requested in repair requests sent by the receiver.

31. The method of claim 28, wherein m satisfies the relationship that the probability of receiving n out of m packets, D(m, n), is greater than a probability threshold P of reliable transmission established for the receiver.

32. The method of claim 31, wherein the probability of receiving n out of m packets is greater than a last chance guarantee probability threshold established for the receiver.

33. The method of claim 31, wherein the receiver implements a policy to achieve an overall block goodput rate such that the probability that a complete block is received on or before a final deadline is the probability threshold P, the method further comprising:

computing m such that the probability $D(m, n)$ of receiving n out of m packets is greater than or equal to $(P-D(l,k))/(1-D(l, k))$, where l is the number of packets of the block previously sent by the sender.

34. The method of claim 33, wherein if $D(l, k) \geq P$, then no further attempt is made by the receiver to obtain the block.

35. The method of claim 31, wherein m satisfies the relationship $$D(m, n) = D(m, n, L) + D(m, n, R),$$

where R is the state of receiving a packet, L is the state of losing a packet, the probability of a receiver in state R remaining in state R is a, the probability of losing a packet and moving to state L is 1−α, the probability of a receiver in state L losing another packet and remaining in state L is β, and the probability of receiving a packet and moving to state R is 1−β, where D(m, n, L) is the probability of sending m packets, receiving at least n packets, and ending up in state L, and D(m, n, R) is the probability of sending m packets, receiving at least n packets, and ending up in state R, $$D(m, n, L) = D(m-1, n, L)\beta + D(m-1, n, R)(1-\alpha),$$

$$D(m, n, R) = D(m-1, n-1, L)(1-\beta) + D(m-1, n, R)\alpha,$$

$$D(n, n, L) = 0,$$

$$D(n, n, R) = P_\alpha \alpha^n + p_\beta (1-\beta)\alpha^{n-1},$$

$$D(n, 0, L) = p_\alpha (1-\alpha)\beta^{n-1} + p_\beta \beta^n,$$

and $$D(n, 0, R) = 0$$

where n>0, $p_\alpha$ is the probability of the system initially residing in state R, and $p_\beta$ is the probability of the system initially residing in state L.

36. The method of claim 31, wherein the block must be decoded prior to a deadline, and m is calculated to insure that the receiver will receive at least k packets in sufficient time to decode the block.

37. The method of claim 31, wherein packet loss is modeled as a temporally-independent loss process with a packet loss probability p and D(m, n) satisfies $$D(m, n) = \sum_{i=n}^{m} \binom{m}{i}(1-p)^i p^{(m-i)}.$$

38. The method of claim 31, further comprising:

calculating a final time $T_{final}$ by which a repair request should be issued to meet a hard deadline, $T_{final}$ satisfying the relationship $$T_{final} = T - (r + p_n\tau + t(b, k)),$$

where T is the time of an earliest deadline for any data packet in the block that has not yet been received, r is an estimated upper bound on round trip time to and from the sender, k is the blocksize, $p_n$ is the number of additional packets that the receiver is requesting that the sender transmit, $\tau$ is the rate at which the sender can inject packets into the network, and t(b, k) is the time required by the receiver to decode and recover b packets from a blocksize of k.

39. Apparatus comprising a computer-readable storage medium tangibly embodying program instructions for managing a multicasting transmission of data, the apparatus comprising instructions operable for causing a programmable processor to:

multicast blocks of data to a plurality of receivers, the blocks including a first block and a second block, the first block comprising $k_1 \geq 1$ data packets, the transmission of the first block comprising an initial transmission of the $k_1$ data packets and $h_1 \geq 0$ repair packets and one or more subsequent transmissions of additional repair packets in response to repair requests, wherein any of the data packets and repair packets provide sufficient information to recover the $k_1$ data packets; and a second block comprising $k_2 \geq 1$ data packets, the transmission of the second block comprising an initial transmission of the $k_2$ data packets and $h_2 \geq 0$ repair packets, wherein any of the data packets and the repair packets of the second block provide sufficient information to recover the $k_2$ data packets of the second block and either or both $k_2$ and $h_2$ differ from $k_1$ and $h_1$, respectively.

40. Apparatus comprising a computer-readable storage medium tangibly embodying program instructions for managing the receipt of data, the apparatus comprising instructions operable for causing a programmable processor to:

insure to a probability p that the receiver will receive enough data packets and repair packets to recover the data packets of a block no later than a deadline time by estimating the end-to-end loss of packets from the sender to the receiver; and initiating proactive forward error correction with the sender to compensate for the estimated loss of packets and to meet the deadline time with a probability not less than p, the proactive forward error correction causing the sender to send previously-unsent repair packets for the block.

41. A system for multicasting data from a sender to a plurality of receivers, said system comprising:

a sender apparatus comprising means for multicasting blocks of data to a plurality of receivers, the blocks including a first block and a second block, the first block comprising $k_1 \geq 1$ data packets, the transmission of the first block comprising an initial transmission of the $k_2$ data packets and $h_1 \geq 0$ repair packets and one or more subsequent transmissions of additional repair packets in response to repair requests, wherein any of the data packets and repair packets provide sufficient information to recover the $k_1$ data packets; and a second block comprising $k_2 \geq 1$ data packets, the transmission of the second block comprising an initial transmission of the $k_2$ data packets and $h_2 \geq 0$ repair packets, wherein any of the data packets and the repair packets of the second block provide sufficient information to recover the $k_2$ data packets of the second block and either or both $k_2$ and $h_2$ differ from $k_1$ and $h_1$, respectively;

a plurality of receiver apparatuses comprising means for initiating proactive forward error correction with the sender to compensate for lost packets, proactive forward error correction causing the sender apparatus to send previously-unsent repair packets for the block; and a network connecting the sender apparatus to said plurality of receiver apparatuses.

* * * * *